United States Patent [19]

Howard

[11] 4,009,265
[45] Feb. 22, 1977

[54] METHODS AND FORMULATIONS FOR THE TREATMENT OF OBESITY

[76] Inventor: Alan Norman Howard, 10 Topcliffe Way, Cambridge, England

[22] Filed: Mar. 5, 1973

[21] Appl. No.: 338,257

[30] Foreign Application Priority Data

Mar. 6, 1972 United Kingdom ............ 10439/72

[52] U.S. Cl. .............................. 424/177; 424/180
[51] Int. Cl.$^2$ ...................... A01N 9/00; A01N 9/28
[58] Field of Search ........................... 424/177, 180

[56] References Cited

UNITED STATES PATENTS 3,849,554  11/1974  Wimitz et al. .................... 424/180

OTHER PUBLICATIONS

Krehl et al., "Amer. J. Clin. Nutr." 20(2) pp. 139–148 (1967) as abstracted in CA vol. 66 (1967) Pars. 63.044a.
"Low Carbohydrate Diet and Cookbook" by Roy Ald, Published by Lancer Books Inc., (1967), New York, N.Y. pp. 1–18.

*Primary Examiner*—Elbert L. Roberts
*Attorney, Agent, or Firm*—Synnestvedt & Lechner

[57] ABSTRACT

It has been discovered that the unfavorable effects observed in weight reduction treatments based on severe dietary restriction (less than 600 Kcals/day) or total fasting (as regards fat, carbohydrates and aminoacids) are avoided by the administration of aminoacids and carbohydrates in critical but much lower amounts than has been believed to be necessary. Nitrogen loss with aminoacid intake between about 15 and 30 g per day is affected by carbohydrate intake. Nitrogen balance is maintained and ketosis and water retention are controlled when the daily intake includes, in addition to necessary minerals and vitamins, at least 15 g of aminoacids in the proportions required by man, and from 15 to 75 g, preferably 30 to 45 g, of carbohydrates, with a total caloric value of from 160 to about 600 Kcals, preferably less than 400 Kcals, very desirably less than 360 Kcals, and optimally in the range of from 180 to 360 Kcals. Formulations are described in which the least amount containing the minimum daily requirement of minerals also contains at least 15 g of aminoacids (as a monomeric aminoacid mixture or as natural protein) and from 15 to 75 g, preferably from 30 to 45 g, of carbohydrates, together with optional other constituents.

20 Claims, 1 Drawing Figure

METHODS AND FORMULATIONS FOR THE TREATMENT OF OBESITY

This invention relates to methods and formulations for the treatment of obesity.

BACKGROUND OF THE INVENTION

When it is required to bring about weight reduction in over-weight patients, it is naturally necessary to reduce their food intake, since the object of the weight-reduction treatment is to cause the body to consume its own fatty tissues in meeting its energy requirements. To this end, it has hitherto been necessary for the diet of the patients to be very strictly controlled and supervised during the period of weight-reduction, which might extend to several months. To exercise so complete a control over the patient's diet it is most convenient to incorporate all the food requirements of the patients into a single dietary composition, and this has been the normal practice. Unfortunately, such controlled diets have hitherto been very unsatisfying, and the patients feel constantly hungry, which is of course very unpleasant. This causes many patients to break off the diet; and even those patients who are motivated sufficiently strongly to stay the course often find that the diet is almost intolerable.

Furthermore, many physiological and psychological problems have hitherto been associated with the clinical use of severe dietary restriction. One of these problems arises from the fact that the body requires a constant supply of nitrogen (in the form of aminoacids or their polymers) to replace the endogenous nitrogen losses resulting from the normal "wear and tear" of the body's protein. If an adequate amount of aminoacids is not supplied there is a loss of body protein, with consequent reduction in muscle mass; this leaves the patient feeling weak and languid. If this protein loss continues for too long it can be dangerous, and even the heart muscle may suffer damage. In fact, this loss of muscle mass is one of the main reasons why total fasting is not favoured as a weight-reduction treatment.

Accordingly, sufficient aminoacids must be provided in the diet to prevent serious endogenous nitrogen loss. It has been thought, up to now, that to avoid the consequences of serious endogenous nitrogen loss it is necessary to supply the patient with about 40 g to about 65 g of protein per day — see for example "Human Nutrition and Dietetics", by Davidson, S. and Passmore, R., 4th Edition (1969) published by E. & S. Livingstone, Edinburgh, page 85.

Another problem arising with complete starvation, and with some conventional diets, is that the blood uric acid level rises greatly, which may lead to gout.

Yet another problem arises from the obvious fact that, during dieting, the body must of course break down and consume its own fatty tissues to meet its energy requirements, and will do so only if its calorie intake is very severely restricted. However, in the absence of sufficient carbohydrate, the catabolism of fatty acids leads to a build-up of ketonic waste-products in the body, leading to a condition known as "ketosis". Severe ketosis gives rise to psychological disturbances such as depression and irritability, and has other unpleasant side-effects including acidosis and nausea. Despite the disadvantage from a weight-loss viewpoint, it is therefore necessary to include carbohydrate in the diet so as to reduce the level of body ketones and thus avoid severe ketosis — as well as also reducing the blood uric acid level, thus lessening the likelihood of gout. Till now it has however been thought that at least about 100 g of carbohydrate per day is needed if ketosis is to be completely prevented (see "Human Nutrition and Dietectics", by Davidson, S. and Passmore, R., 4th Edition (1969), page 127) and this is also considered to prevent a rise in blood uric acid level. Some conventional diets in fact give the patient as much as 400–500 g/day of carbohydrate.

If one tries to avoid the problems caused by the absence of sufficient carbohydrate by using instead a low-calorie diet in which a relatively large percentage of the total calories is derived from carbohydrates, then the body tends to retain a considerable amount of water in its tissues. Although this is not desirable, it could be tolerated within reason by the clinician, since the retained water will be largely shed when the patient resumes a normal diet — but it has an adverse effect on the patient, since his weight due to water retention remains almost constant while on the diet, which is frustrating to the patient who can see no visible signs of the diet achieving its purpose. Moreover this water-retention cannot be tolerated even by the clinician beyond a certain point, since it leads to edema. The patient is losing fat, but his tissues are retaining about the same weight of water, and if this continues for a prolonged period, edema results and fluid collects around the ankle joints.

Previous research has revealed the existence of the problem outlined above, but has found no way of resolving the apparently conflicting requirements of patients for carbohydrates during dieting. It has simply been assumed that in order to prevent catabolism of aminoacids the patient must be supplied with a fairly large quantity of carbohydrates.

SUMMARY OF THE INVENTION

It has now been discovered in experimental trials with obese patients that, provided the carbohydrate intake of the patient is at least about 30 to about 45 g/day, the amount of aminoacids required to maintain overall nitrogen equilibrium is only about 15–25 g/day — about one-third to one-half of the amount previously thought necessary. If the carbohydrate intake is below about 30 g/day, larger amounts of aminoacids are required. For example, if the carbohydrate intake is reduced to 15 g, the aminoacid requirement for nitrogen equilibrium rises above 25 g. At these carbohydrate intakes, water retention is absent or minimal. When the carbohydrate intake is increased above about 45 g/day water retention begins to be observable, and with amounts above about 75 g/day the water retention may be severe enough to be diagnosed as clinical edema.

In the light of the above discoveries it can be seen that conventional diets for the treatment of obesity are far from ideal. These conventional diets are usually prepared from normal food ingredients selected to be of high protein content, but relatively low in fat and carbohydrate. The nutrient balance of the preparations may be further adjusted by blending in other food ingredients such as specific proteins isolated from foodstuffs, vitamins and minerals. Since a diet consisting of protein with some carbohydrate and fat is not very bulky, non-calorific substances, such as cellulose and methyl cellulose or similar materials, are sometimes added to provide bulk and hence give a feeling of satiety.

Usually such conventional diets will give a protein intake of about 40–60 g/day or more and a carbohydrate intake in excess of 100 g/day, but so balanced and supplemented with fats as to supply 900–1200 Kcals/day. Thus these conventional diets supply far larger quantities of protein and carbohydrate than the minima now discovered to be necessary. As previously indicated such conventional formulations suffer from the disadvantages that they cause retention of body water due to their high carbohydrate content, and that they are high in calories, thus slowing down the rate of weight loss. In addition, many of them contain the essential and non-essential aminoacids in the wrong proportions.

There are other commercially-available food preparations which are not specifically intended for the treatment of obesity, but which do contain aminoacids present in substantially the proportions required by man — these however all contain more carbohydrate than the above-mentioned optimum.

For instance, one such known preparation intended for administration to patients who are to undergo intestinal surgery contains aminoacids and carbohydrate in a weight ratio of about 1 : 10. If this preparation were used during severe dietary restriction to treat obesity, in order to satisfy the minimum requirement of protein now found to be necessary it would have to be given at a rate of about 165 g/day, thus giving 15 g/day of protein and 150 g/day of carbohydrate, equivalent to about 660 Kcals. Apart from the previously-discussed water-retention effects encountered with an excessive proportion of carbohydrate content, the use of such a high-calorie preparation also decreases the rate at which weight is lost.

Another known, commercially-available food preparation sold as an all-in-one breakfast substitute contains the minerals and essential aminoacids in the proportions required by man as well as carbohydrate and most of the necessary vitamins. Only the dry mixture however has any similarity to the dietary formulations of this invention, and even then its carbohydrate content is so high as to give rise to clinical edema supposing it were used as a sole foodstuff — while when used in accordance with the directions, admixed with the suggested amounts of milk, its calorie value would be far too high for use in the dietary methods and formulations of the present invention.

It is an object of this invention to provide a dietary method and formulation for the treatment of obesity in man which takes account of the newly-discovered minimum requirements of the patient for aminoacids and carbohydrate and which thus overcomes the disadvantages of the diets and preparations known in the prior art.

Accordingly, this invention provides a dietary formulation for the treatment of obesity in man, which comprises:
a. all the minerals required by man; and
b. proteinaceous material selected from at least one member of the class consisting of:
 i. a mixture of monomeric L-aminoacids, and
 ii. natural proteins, and
 iii. natural proteins reinforced with at least one monomeric L-aminoacid; and
c. digestible carbohydrate;
characterized in that the smallest amount of the dietary formulation containing at least the minimum daily requirements of each of the minerals required by man also contains:
 A. at least 15 g of said proteinaceous material which must include at least the minimum daily requirements for man of all the essential L-aminoacids required by man; and
 B. from 15 g to 75 g of said carbohydrate;
and further characterized in that the total caloric value of said smallest amount of the dietary formulation is in the range of from 160 Kcals to 600 Kcals.

The minerals required by man are sodium, potassium, calcium, magnesium, manganese, iron, copper, zinc, chloride, phosphorus, sulfur, iodine and other trace elements. These minerals could theoretically be supplied in the form of tablets separate from the other ingredients of the formulation of this invention; but the mineral requirements of man amount to about 20 g/day, which in practice is too much to give conveniently in the form of tablets, and anyway the minerals alone are very unpleasant to take, and tend in some patients to act as emetics. Accordingly the formulations of this invention already incorporate the minerals required by the patient. The minerals which are likely to be deficient in any dietary formulation and which must therefore be monitored with particular care are those listed below, with their minimum daily requirements, as follows:

| MINIMUM DAILY REQUIREMENTS OF MINERALS FOR MAN | |
| --- | --- |
| Calcium | 800 mg |
| Phosphorus | 800 mg |
| Iodine | 140 μg |
| Iron | 10 mg |
| Magnesium | 350 mg |

Other mineral requirements must naturally also be met, for instance sodium and potassium, as will be well-known to those skilled in the art — but in general it should be found that trace elements are supplied in sufficient amount without special attention being paid to them.

The proteinaceous material used in the dietary formulations of this invention can be supplied either in the form of a mixture of monomeric L-aminoacids or in the form of natural protein — or perhaps in the form of the latter reinforced with at least some of the former. Preferably the aminoacids will be present as monomeric L-aminoacids, since it is then easier to adjust the aminoacid profile to achieve the optimum nitrogen utilization; it will be appreciated that any deviation from the optimum aminoacid profile either leaves the body short of certain aminoacids — with consequent serious disturbances in protein metabolism — or forces the body to make the required aminoacids from other aminoacids, which is a rather inefficient process. In either case, more of the aminoacid mixture is then required by the patient.

The preferred compositions of this invention are those in which all the L-aminoacids, i.e. both the essential and the semi-essential ones, are present in the relative proportions required by man. The aminoacid profile essential to man is well-known to those skilled in the art, and for example is set out in Rose, W. C., Wixom, R. L., Lockhart, H. A., Lambert, G. F., *J. Biol. Chem.*, (1955), 217, page 987. The optimum profile is also illustrated by the formulation described in detail below. The L-aminoacids useful to man are isoleucine, leucine, lysine, methionine, phenylalanine, threonine, tryptophan, valine (those being the so-called essential aminoacids), together with alanine, arginine, aspartic acid, cystine, glutamic acid (or glutamine), glycine, histidine, hydroxyproline, proline, serine and tyrosine (the so-called non-essential or semi-essential aminoacids).

Where the formulation of this invention contains monomeric L-aminoacids, a convenient and cheap method of producing the required aminoacid mixture is to take a protein hydrolysate (produced by any conventional procedure, such as by subjecting a protein to hydrolysis using an acid or a proteolase as the hydrolytic agent — various such protein hydrolysates are available commercially) analysing its aminoacid profile and adjusting to the optimum profile, either by adding the required quantities of the pure aminoacids to make up for any deficiencies and/or by passing the hydrolysate through suitable combinations of anionic and cationic exchange resins (these being already well-known) to aliminate any excesses.

On the other hand, where the dietary formulation contains the aminoacids in the form of natural protein, this most conveniently will be egg protein, since this already contains aminoacids in the relative proportions required by man (see Davidson, S. and Passmore, R., "Human Nutrition and Dietetics", E. & S. Livingstone, (1969), page 80).

However, despite being deficient in one or more aminoacids, other proteinaceous materials may also be employed, preferably for instance such proteinaceous materials as those derived from milk, soya beans, peanuts, fish and plasma proteins. When such aminoacid-deficient proteins are used, it is necessary either tO add the appropriate aminoacids to adjust the profile accordingly, or to give an excess of protein such that the minimum requirements of even the most deficient aminoacid are met.

The carbohydrate in the formulation of this invention can be any digestible carbohydrate such as a readily absorbable monosaccharide, for example glucose, glucose-δ-lactone, fructose or lactose, di-saccharides such as sucrose or maltose, or a polysaccharide, for example edible starch or dextrin. However, a dietary formulation containing large quantities of mono- and di-saccharides tends to have undesirable side-effects. Pure mono- and di-saccharides are very sweet and some patients find a dietarY formulation containing them highly unpalatable. In addition, mono- and di-saccharides, because of their high osomotic pressure, tend to induce nausea and their rapid absorption into the blood stream leads to sudden large increases in blood sugar, with the consequent risk of insulin rebound and hyopglycaemia. Thus, it is preferred that the carbohydrate used in the dietary formulation of this invention be partially hydrolysed poly-saccharides, since these do not suffer from the undesirable effects associated with mono- and di-saccharides. The preferred partially hydrolysed polysaccharides are those oligo-saccharides having an average molecular weight (as determined by osmosis) of from 3 to 10 times that of the corresponding monomer, the optimum molecular weight being 4 to 6 times that of the monomer. Dextrose oligosaccharides are especially suitable. The oligosaccharides can conveniently be used as the only source of carbohydrate or alternatively mixed with a proportion of mono- or di-saccharide; a mixture of 1 part mono- or di-saccharide with from about 3 to about 5 parts by weight of oligosaccharide is suitable.

Further to illustrate the invention, some of the most important parameters of the dietary formulation are shown in the accompanying drawings, in which.

Figure 1:
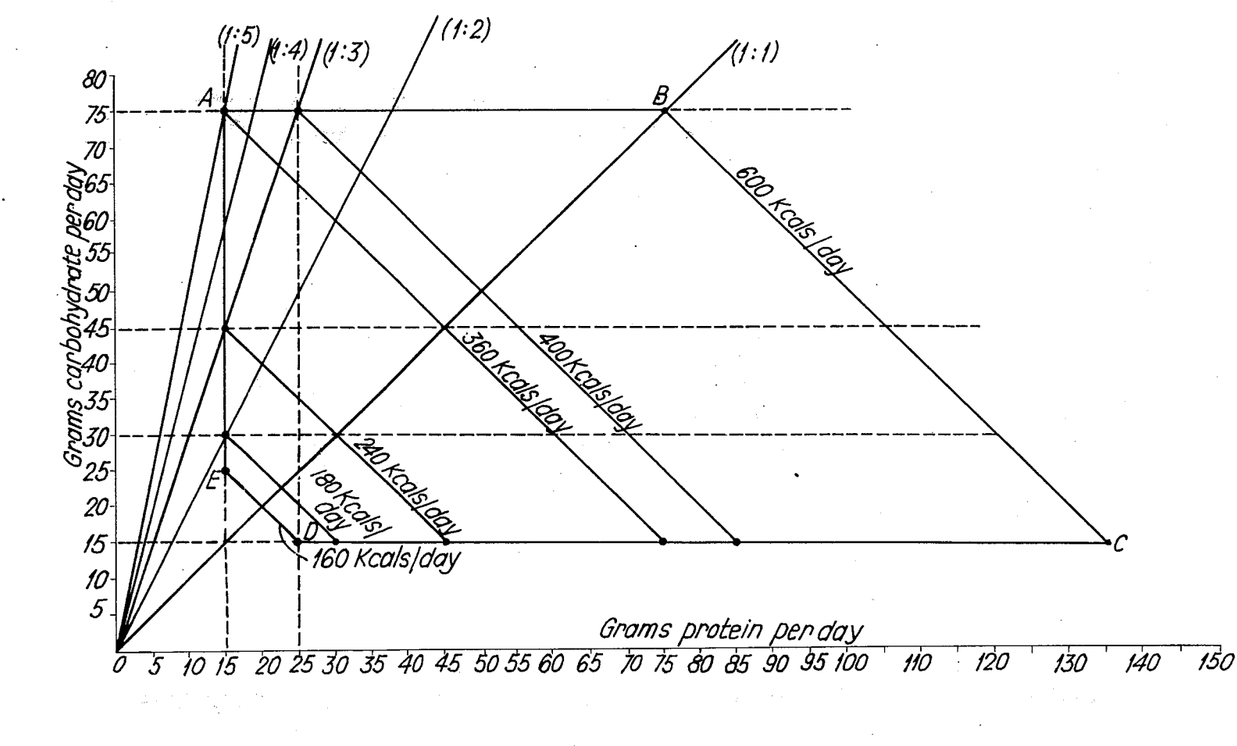
FIG. 1 is a graphical representation of the absolute and relative amounts of carbohydrate and proteinaceous material in the dietary formulation on a per diem basis, wherein the grams of carbohydrate given per day are plotted along the ordinate, while the grams of proteinaceous material given per day are plotted along the abscissa.

In FIG. 1, the dietary formulations of the invention are those lying within the pentagon ABCDE. The line AE represents the minimum of 15 gm protein per day; any dietary formulation or other food preparation lying to the left of this line contains insufficient protein, and causes endogenous nitrogen loss in the patient.

The lines AB and DC represent respectively the maximum of 75 gm per day of carbohydrate and the minimum of 15 gm per day of carbohydrate. Above 75 gm/day, severe water-retention problems are encountered, so that weight loss is retarded, and edema may set in; whilst below 15 gm/day of carbohydrate, severe problems are encountered with ketosis.

The line BC represents the upper limit of 600 Kcals/day, which is the line below which the patient can be regarded as undergoing the severe dietary restriction with which this invention is concerned, and which differentiates it completely from conventional dietary regimes. However, to achieve the rapid weight losses which are desired, it is greatly preferred to limit the calorie-intake to less than 400 Kcals/day, and the best results are secured below an upper limit of 360 Kcals/day. The line ED represents the absolute lower limit of 160 Kcals/day, below which it is no longer possible to maintain the patient's nitrogen equilibrium. Between these upper and lower limits, the preferred range of calorie intake on a balance of all considerations, is in the range of from 180 to 240 Kcals/day.

On the graph of FIG. 1 there have also been plotted lines representing weight ratios of proteinaceous material to carbohydrate ranging from 1 : 1 up to 1 : 5.

The ratio of aminoacids to carbohydrates in the dietary formulations of this invention must not decrease below 1 : 5, since then the dietary formulation is too high in calories, thus reducing the rate of weight loss, while the problems of fluid retention mentioned above become very severe. Preferably the ratio of aminoacids to carbohydrates will not exceed about 1 : 1, since clinical tests have shown that if that ratio increases above about 1 : 1 then the tendency to ketosis sets in and becomes increasingly severe — while anyway, such formulations are expensive, since they contain a high proportion of the relatively — costly aminoacids.

The optimum daily intake for the patient is about 15 to about 25 g aminoacids and from about 30 to about 45 g carbohydrate. As stated above, however, the ratio of aminoacids to carbohydrate in the dietary formulations of this invention preferably lies in the range of from about 1 : 1 to about 1 : 5, and it is especially preferred that it lie in the range of from about 1 : 2 to about 1 : 4, most desirably in the range of from 1 : 2 to 1 : 3.

Within these parameters it is possible for the patient to be given the preferred low calorie intake of 180–240 Kcalories/day. At that low rate of intake, ketosis is at most very moderate, and certainly such that the above-mentioned unpleasant side-effects of severe ketosis are negligible.

An unexpected advantage of the dietary formulations of this invention is the absence of physical distress such as hunger. Although the precise reason is not known, it is possible that the presentation of these various nutrients as aminoacids and as simple carbohydrates and/or polysaccharides may affect alimentary secretions and preistalsis, thereby suppressing hunger. As a consequence of the good physical condition of the patients and the absence of distress, they remain in a good psychological state with little desire to cheat or to depart from the diet until the desired weight loss has been achieved.

Vitamins in the amounts needed by the patient may be administered separately from the other dietary ingredients, since unlike minerals there are no problems of bulk or nausea with vitamins. It is however generally most convenient if the necessary vitamins are incorporated in the formulation with the other constituents. As is well-known to those skilled in the art, the essential vitamins are vitamin A (either as such or as carotene), vitamin $B_{12}$ (cyanocobalamin), vitamin C (ascorbic acid), vitamin D (e.g. calciferol), vitamin E (tocopherol), vitamin K (or 2-methyl-1:4-naphthoquinone), para-aminobenzoic acid (preferably given as the potassium salt), riboflavin, pyridoxin, niacin, inositol, calcium pantothenate, biotin, folic acid, choline and thiamin hydrochloride. The so-called minimum daily requirements of man for each of these vitamins are well-known (though there is some disparity between the standards established in different countries) and may be found in any standard work on nutrition, such as for example "Human Nutrition and Dietetics", by Davidson, S. and Passmore, R., 4th Edition (1969) published by E. & S. Livingstone, Edinburgh, pages 244 and 255.

The accepted minimum daily requirements of man for the most important of the vitamins are set out below, as follows:

| MINIMUM DAILY REQUIREMENTS OF VITAMINS FOR MAN | |
| --- | --- |
| Ascorbic acid (Vitamin C) | 60 mg |
| Folic acid | 0.4 mg |
| Niacin | 18 mg |
| Riboflavin | 1.7 mg |
| Thiamin | 1.4 mg |
| Vitamin A | 5000 i.u. |
| Vitamin $B_6$ | 2.0 mg |
| Vitamin $B_{12}$ | 5.0 μg |
| Vitamin D | 400 i.u. |
| Vitamin E | 30 i.u. |

The minimum daily requirements for the other essential vitamins are so minimal as to be difficult to establish with certainty, and therefore have not been laid down precisely. The currently accepted levels can be adhered to by following the recommendations in the dietary formulation described in detail hereinafter.

Even when subjected to dietary restriction, man requires certain amounts of fat, oil or other source of essential fatty acid. This fat or oil may be given separately; but for general convenience it is much preferred that the formulation should also contain enough fat or oil to supply at least the minimum requirements of the patient for essential fatty acids. The amount of oil and fat required by man is subject to some uncertainty — but following "Human Nutrition and Dietetics" (loc. cit.) page 112, it may be assumed to be from about 2.4 to about 3.8 g./day. The preferred fats/oils are highly-unsaturated vegetable oils, especially those having a high content ( ≥ 25%) of linoleic acid, such as for example safflower seed oil or ethyl linoleate. The formulation therefore will normally contain at least about 3% by weight and not more than about 10% by weight of safflower oil or equivalent.

The dietary formulations may contain a bulking component, for example cellulose or methyl cellulose or a gum such as acacia gum, tragacanth gum, guar gum or xanthan gum. The amount of any such bulking components will usually be small, say less than about 10% by weight of the formulation, but can in some cases amount to 50% or even more. The dietary formulation may also contain an emulsifier of the kind recommended for use in foodstuffs, for example polyoxyethylene sorbitan mono-oleate, and can also incorporate flavouring agents to increase palatability.

This invention also provides a method for the treatment of obesity in man, which comprises the steps of giving the overweight patient a daily diet consisting essentially of:
 a. at least the minimum daily requirement of all the minerals required by man;
 b. proteinaceous material selected from at least one member of the class consisting of:
  i. a mixture of monomeric L-aminoacids, and ii. natural proteins, and iii. natural proteins reinforced with at least one monomeric L-aminoacid;
 c. digestible carbohydrate;
 d. at least the minimum daily requirement of all the vitamins required by man; and
 e. sufficient fat, oil or other source of essential fatty acid to supply the patient's minimum fatty acid requirements;
said method being characterized in that the amount of proteinaceous material given daily is at least 15 g. and contains at least the minimum daily requirements for man of all the essential L-aminoacids required by man, and the amount of carbohydrate given daily is from 15 to 75 g, and that the total caloric value of the daily diet is in the range of from 160 Kcals to 600 Kcals.

The upper limit of 600 Kcals/day represents the dividing line between the severe dietary restriction with which this invention is concerned and conventional dietary regimes. However, to achieve the rapid weight losses which are desired it is greatly preferred to limit the calorie-intake to less than 400 Kcals/day, and for most purposes an upper limit of not more than 360 Kcals/day will be appropriate. Below the absolute lower limit of 160 Kcals/day it is no longer possible to maintain the patient's nitrogen equilibrium. Between these upper and lowe limits, the preferred range of calorie intake, on a balance of all considerations, is in the range of from 180 to 240 Kcals/day. The minerals will preferably be given in substantially the relative proportions required by man. The ratio by weight of the proteinaceous material to the digestible carbohydrate in the diet should desirably be in the range of from 1 : 2 to 1 : 4, and most desirably between 1 : 2 and 1 : 3.

The proteinaceous material in the diet will advantageously consist of or include egg albumin, but other proteinaceous materials can be used such as natural protein derived from milk, soya beans, peanuts, fish and/or plasma, preferably reinforced with at least one monomeric L-aminoacid to adjust its aminoacid profile to that required by man. Alternatively, the proteinaceous material may be a mixture of aminoacids produced by taking a protein hydrolysate (produced by subjecting a protein to hydrolysis by an acid or a proteolase) analysing its aminoacid profile and adjusting to the optimum profile either by adding the required quantities of aminoacids or by passing the hydrolysate through suitable ion-exchange resins.

The carbohydrate component in the diet of this invention is advantageously a partially hydrolyzed polysaccharide, preferably an oligosaccharide having an average molecular weight (as determined by osmosis) of from 3 to 10 times (most desirably 4 to 6 times) that of the corresponding monomer.

It is necessary that the diet should include at least the minimum daily requirements of each of the vitamins required by man, and it is very desirable that these vitamins should be present in substantially the relative proportions required by man. It is also necessary that the diet should include at least the minimum daily fatty acid requirements of man; the fatty acid is preferably present in the form of a highly unsaturated vegetable oil, most preferably one containg at least 25% of linolenic acid. Desirably, the fatty acid comprises not more than 10% by weight of the diet.

DESCRIPTION OF THE PREFERRED EMBODIMENT

In order that this invention may be more easily understood, the following Examples will now be given though by way of illustration only, to show details of the dietary formulations of this invention and the clinical test results obtained using such formulations in comparison with others.

DIETARY FORMULATION

The following Table sets out the ingredients of a dietary formulation of this invention which has been proved by clinical trials to be eminently suitable for the treatment of obesity in man. For comparison, the ingredients of a known dietary formulation, intended for use as a non-residual foodstuff for patients undergoing intestinal surgery or the like, are also set out. In the dietary formulation of the present invention the ratio by weight of L-aminoacid to carbohydrate is 1 : 2.4, while in the comparison formulation it is approximately 1 : 10.

It will be seen that the dietary formulation of this invention is much richer in aminoacids on a percentage basis than the prior art formulation. It is also richer in vitamins and minerals; this is because the prior art formulation is intented to be given in amounts of about 450 to 650 g/day, whereas the formulation of the present invention is intended to be given in amounts of less than 100 g/day. It should also be noted that the formulation of this invention contains dextrose oligosaccharide as the major part of its carbohydrates, whereas the carbohydrate in the prior art formulation consists primarily of glucose, with a small amount of glucose -δ-lactone.

The dietary formulation of this invention is normally administered in water, and preferably in amounts of 1 liter or more per day, in 3 to 6 divided doses. Thus, the concentration of nutrients in the liquid actually administered would normally be equal to less than 15 – 25 g/l aminoacids and 75 g/l carbohydrate.

TABLE 1

| | Formulation of the present invention | | Formulation of the prior art | |
|---|---|---|---|---|
| | (per 1000 g of formulation) | | | |
| Amino acids | | | | |
| L-Lysine HCl | 10.02 | g | 5.48 | g |
| L-Leucine | 13.37 | g | 5.87 | g |
| L-Isoleucine | 8.45 | g | 3.71 | g |
| L-Valine | 9.31 | g | 4.09 | g |
| L-Phenylalanine | 9.63 | g | 4.21 | g |
| L-Arginine HCl | 16.40 | g | 8.73 | g |
| L-Histidine HCl H$_2$O | 4.10 | g | 2.42 | g |
| L-Alanine | 9.02 | g | 3.95 | g |
| L-Aspartic Acid | 19.19 | g | 8.42 | g |
| L-Threonine | 8.45 | g | 3.71 | g |
| L-Proline | 12.04 | g | 5.24 | g |
| Glycine | 14.69 | g | 6.43 | g |
| L-Serine | 6.19 | g | 2.71 | g |
| L-Tyrosine ethyl ester HCl | 10.54 | g | 6.28 | g |
| L-Glutamine | 31.69 | g | 13.89 | g |
| L-Methionine | 8.65 | g | 2.68 | g |
| L-Tryptophan | 2.60 | g | 1.15 | g |
| Total: | 194.3 | g | 88.97 | g |
| Salts | | | | |
| Potassium iodide | 1.94 | mg | 0.23 | mg |
| Manganous acetate . 4H$_2$O | 237 | mg | 28.07 | mg |
| Cupric acetate . H$_2$O | 32.35 | mg | 3.83 | mg |
| Sodium glycerophosphate | 67.7 | g | 8.0 | g |
| Sodium chloride | 89.3 | g | 8.19 | g |
| Ferrous ammonium sulphate | 8.83 | g | 1.04 | g |
| Zinc chloride | 15.53 | mg | 1.84 | mg |
| Potassium hydroxide | 13.35 | g | 6.08 | g |
| Potassium chloride | 53.1 | g | — | |
| Magnesium oxide | 6.31 | g | 0.567 | g |
| Sodium hydroxide | — | | 2.56 | g |
| Calcium chloride , 2H$_2$O 31.57 | 31.57 | g | 3.74 | g |
| Total: | 270.6 | g | 30.18 | g |
| Vitamins | | | | |
| Thiamin HCl | 15.5 | mg | 1.84 | mg |
| Riboflavin | 22.0 | mg | 2.60 | mg |
| Pyridoxin HCl 21.6 | 21.6 | mg | 2.56 | mg |
| Niacinamide | 129.4 | mg | 15.31 | mg |
| Inositol | 10.74 | mg | 1.27 | mg |
| d-Ca pantothenate | 181.2 | mg | 21.50 | mg |
| Vitamin A acetate | 64,700 Int. units | | 7,700 Int. units | |
| Vitamin D$_2$ – D$_3$ | 5,180 Int. units | | 613 Int. units | |
| d-Biotin | 3.88 | mg | 0.46 | mg |
| Folic acid | 21.6 | mg | 2.56 | mg |
| Ascorbic acid | 1.035 | g | 122.5 | mg |
| Cyanocobalamin | 0.194 | mg | 23.0 | μg |
| p-Amino benzoic acid | 5.380 | g | 636.0 | mg |
| Choline bitartrate | 2.990 | g | 341.0 | mg |
| α-Tocopherol acetate | 388.1 | mg | 45.9 | mg |
| Menadione (Vit. K) | 776.4 | mg | 91.9 | mg |
| Total: | 11.0 | g | 1.286 | g |
| Carbohydrate | | | | |
| Glucose | 54.3 | g | 849.9 | g |
| Glucose-δ-lactone | — | | 23.54 | g |
| Dextrose oligosaccharides | 418.0 | g | — | |
| Total: | 472.3 | g | 873.44 | g |
| Fats | | | | |
| Ethyl linoleate | 25.9 | g | — | |
| Safflower oil | — | | 3.06 | g |
| Total: | 25.9 | g | 3.06 | g |
| Emulsifier | | | | |
| Polyoxyethylene sorbitan monooleate | 25.9 | g | 3.06 | g |

CLINICAL TEST RESULTS

Following a period of starvation for two weeks (in which no food except vitamins and minerals were given) a series of nine different experimental diets were given to human patients each for a period of at least two weeks as shown in Table 2 (some of the diets were in accordance with this invention and some were not).

The constitution and amounts of each diet given contained the minimum quantity of aminoacids normally needed to maintain nitrogen balance. The diets used were simply formulated by mixing the appropriate amounts of the aminoacid mixture and carbohydrate together in bulk and then adding a days supply of vitamins and minerals to a daily dose of this bulk mixture. and some outside those of the invention, may be summarized as follows:

Table 2

| | g. amino-acids | g. carbo-hydrate | Amino-acid: carbohy-drate wt. ratio | Wt. of composn. given (gms/day) | Cals per day | approximate weight change kg/week | Ketosis | Cost/Week | Body Fluid Balance | Psychological state of patient | Effect of Treatment on serum uric acid level | Willingness to remain on diet |
|---|---|---|---|---|---|---|---|---|---|---|---|---|
| Control | 30 | 0 | 1:0 | 30 | 120 | −1.5 to −3.0 | Very severe | High | Diuresis | Poor | Raised significantly | Poor |
| Lower limit of carbo-hydrate | 30 | 15 | 1:0.5 | 45 | 180 | −1.5 to −3.0 | Severe | High | Diuresis | Poor | Raised significantly | Poor |
| Preferred Formulations of Invention | 22.5 | 22.5 | 1:1 | 45 | 180 | −1.0 to −2.5 | Moderate | Moderate | No excessive loss or water retention | Excellent | Slightly raised | Good |
| | 15 | 30 | 1:2 | 45 | 180 | −1.0 to −2.5 | Moderate | Moderate | | Excellent | raised | Good |
| | 15 | 45 | 1:3 | 60 | 240 | −1.0 to −2.5 | Slight | Moderate | | Excellent | Not | Good |
| | 15 | 60 | 1:4 | 75 | 300 | −1.0 to −2.5 | Very slight | Moderate | Slight water retention | Good | raised | Good |
| | 15 | 75 | 1:5 | 90 | 360 | −0.5 to −2.0 | or absent | Moderate | | Good | Not raised | Good |
| Control | 15 | 90 | 1:6 | 105 | 410 | +2.0 to −0.5 | Absent | Moderate | Excessive Water retention | Poor | Not raised | Poor |
| Control | 15 | 120 | 1:8 | 135 | 540 | +2.0 to −0.5 | Absent | Moderate | | Poor | Not raised | Poor |
| Control | 15 | 150 | 1:10 | 165 | 660 | +2.0 to −0.5 | Absent | Moderate | | Poor | Not raised | Poor |

[Note: The nature of the aminoacid and carbohydrate components used in these tests is described below]

The aminoacid component used in the tests reported in Table 2 above was a mixture of monomeric L-aminoacids having the following constitution:

| Essential aminoacids | |
|---|---|
| L-Isoleucine | 4.34 % |
| L-Leucine | 6.87 % |
| L-Lysine[1] | 5.16 % |
| L-Methionine | 4.45 % |
| L-Phenylalanine | 4.95 % |
| L-Threonine | 4.34 % |
| L-Tryptophan | 1.35 % |
| L-Valine | 4.79 % |
| Non-essential aminoacids | |
| L-Alanine | 4.64 % |
| L-Arginine[1] | 8.48 % |
| L-Aspartic acid | 9.88 % |
| L-Glutamine | 16.30 % |
| Glycine | 7.56 % |
| L-Histidine[1] | 2.11 % |
| L-Proline | 6.18 % |
| L-Serine | 3.17 % |
| L-Tyrosine[2] | 5.43 % |

[Notes:
(1) Present in diet as the monohydrochloride;
(2) Present in diet as the ethyl ester monohydrochloride.]

It should however be noted that the same tests have also been conducted, with the aminoacid/carbohydrate ratios of from 1:1 up to 1:5, using the following other proteinaceous materials, namely:
a. Purified precipitate of calcium salts of milk
   Protein — 100 g
   L-Methionine — 2g
and b. Egg albumin The results obtained using these other proteinaceous material were the same as when using the monomeric L-aminoacid mixture.

The carbohydrate used in the tests reported in Table 2 was in most cases pure dextrose oligosaccharide, though in some instances a small admixture of glucose was also present.

The advantages and disadvantages of the diets having various aminoacid:carbohydrate ratios, some inside and some outside those of the invention, may be summarized as follows:

The weight losses secured with an aminoacid : carbohydrate ratio of 1 : 0 were good, though much of this was due to excessive loss of body water. Ketosis on the other hand was very secure, serum uric acid level was raised, and the psychological condition of the patient was poor — so poor that it was difficult to persuade the patients to remain on the diet because of irritability and aggressiveness. Moreover, with negligible carbohydrate content, the quantity of expensive aminoacids in the diet to maintain nitrogen balance was greatly increased, making the diet unduly costly.

At the other end of the scale, with aminoacid : carbohydrate ratios of greater than 1 : 5, there was no ketosis, no effect on serum uric acid level, and the cost of the diet was moderate. On the other hand, the weight losses secured were poor, and indeed patients often gained weight, due to water retention. Moreover, the failure to lose weight caused the psychological state of the patients to be poor and it was difficult to persuade them to continue on the diet.

However, when the aminoacid : carbohydrate ratio was 1 : 0.5 ketosis was no longer very severe; and within the preferred limits of from 1 : 1 to 1 : 5 high rates of weight-loss were secured while the psychological condition of the pateient remained excellent. Ketosis was very moderate to slight, and the blood serum uric acid level was not raised by this treatment. Encouraged by their satisfactory weight loss and absence of hunger, the patients were willing to continue on the diet for long periods. Their general health was good, and they all remained ambulatory. It can be seen that the best diets were those having ratios of from 1 : 2 to 1 : 3.

The data shown in Table 2 also demonstrates that ketosis becomes very severe when the absolute amount of carbohydrate in the diet drops below 15 g./day; while water-retention becomes excessive (and indeed clinical edema sets in) when it exceeds 75 g./day. Similarly it can be seen that the best results in terms of weight-loss and a balance of other factors are clearly secured at calorie-intakes of from 180 – 360 Kcals/day, and the psychological state of the patients was best at a calorie intake of 180 – 240 Kcals/day.

I claim:

1. A method for treating obesity in which an individual ingests on a daily basis a dietary formulation which comprises:
    a. all the minerals required by man;
    b. proteinaceous material selected from at least one member of the class consisting of:
        i. a mixture of monomeric L-aminoacids, and
        ii. natural proteins, and
        iii. natural proteins reinforced with at least one monomeric L-aminoacid; and
    c. digestible carbohydrate;
characterized in that the smallest amont of the dietary formulation containing at least the minimum daily requirements of each of the minerals required by man, including at least 800 mg calcium, 800 mg phosphorous, 140 µg iodine, 10 mg iron and 350 mg magnesium, also contains:
    A. at least 15 g of said proteinaceous material which must include at least the minimum daily requirements for man of all the essential L-aminoacids requied by man; and
    B. from 15 to 75 g of said carbohydrate, and further characterized in that the total caloric value of said smallest amount of dietary formulation is in the range of from 160 to 600 Kcals.
and wherein the amount of said dietary formulation ingested daily by said individual is such that it provides said individual with: at least 15 g of said proteinaceous material; from 15 to 75 g of said carbohydrate; and 160 to 600 Kcals.

2. A method according to claim 1 wherein the caloric value of said smallest amount of the formulation is not greater than 400 Kcals and wherein the amount of the formulation ingested daily by said individual provides said individual with no greater than 400 Kcals.

3. A method according to claim 2 wherein the caloric value of said smallest amount of the formulation is not greater than 360 Kcals and wherein the amount of the formulation ingested daily by said individual provides said individual with no greater than 360 Kcals.

4. A method according to claim 1, in which the said smallest amount of the formulation includes at least the minimum daily requirements of each of the vitamins required by man in substantially the relative proportions required by man and at least the minimum daily fatty acid requirements of man.

5. A method for the treatment of obesity in man, which comprises the steps of giving the overweight patient a daily diet consisting essentially of:
    a. at least the minimum daily requirement of all the minerals required by man, including at least 800 mg calcium, 800 mg phosphorous, 140 µg iodine, 10 mg iron and 350 mg magnesium;
    b. proteinaceous material selected from at least one member of the class consisting of:
        i. a mixture of monomeric L-aminoacids, and
        ii. natural proteins, and
        iii. natural proteins reinforced with at least one monomeric L-aminoacid;
    c. digestible carbohydrate;
    d. at least the minimum daily requirement of all the vitamins required by man; and
    e. sufficient fat, oil or other source of essential fatty acid to supply the patient's minimum fatty acid requirements;
said method being characterized in that the amount of proteinaceous material given daily is at least 15 g and contains at least the minimum daily requirements for man of all the essential L-aminoacids required by man, and the amount of carbohydrate given daily is from 15 to 75 g, and that the total caloric value of the daily diet is in the range of from 160 to 600 Kcals.

6. A method according to claim 5, in which the total caloric value of the daily diet is not greater than 400 Kcals.

7. A method according to claim 5, in which the minerals are given in substantially the relative proportions required by man.

8. A method according to claim 5, in which the ratio by weight of the proteinaceous material to the digestible carbohydrate in the daily diet is in the range of from 1:1 to 1:5.

9. A method according to claim 5, in which the proteinaceous material in the diet is or includes natural protein derived from at least one member of the class consisting of egg albumin, milk, soya beans, peanuts, fish and plasma.

10. A method according to claim 5, in which the proteinaceous material in the diet is or includes natural protein derived from at least one member of the class consisting of milk, soya beans, peanuts, fish and plasma, reinforced with at least one monomeric aminoacid to adjust its aminoacid profile to that required by man.

11. A method according to claim 5, in which the proteinaceous material is or includes a mixture of aminoacids produced by taking a protein hydrolysate (produced by subjecting a protein to hydrolysis by an acid or a proteolase), analysing its aminoacid profile and adjusting same to the optimum profile either by adding the required quantities of aminoacids or by passing the hydrolysate through suitable exchange resins.

12. A method according to claim 5, in which the carbohydrate in the diet comprises a partially-hydrolyzed polysaccharide.

13. A method according to claim 1 wherein the caloric value of said smallest amount of the formulation is in the range of from 180 to 240 Kcals and wherein the amount of the formulation ingested daily by said individual provides said individual with 180 to 240 Kcals.

14. A method according to claim 5 in which the total caloric value of the daily diet is not greater than 360 Kcals.

15. A method according to claim 5 in which the total caloric value of the daily diet is in the range of 180 to 240 Kcals.

16. A method for treating obesity in which an individual ingests a daily diet consisting essentially of:
    a. at least the minimum daily requirement of all the minerals required by man, including at least 800 mg calcium, 800 mg phosphorous, 140 µg iodine, 10 mg iron and 350 mg magnesium;
    b. proteinaceous material selected from at least one member of the class consisting of:
        i. a mixture of monomeric L-amino-acids, and
        ii. natural proteins, and
        iii. natural proteins reinforced with at least one monomeric L-amino-acid; and
    c. digestible carbohydrate;

said method being characterized: in that the amount of proteinaceous material ingested daily is at least 15 g and contains at least the minimum daily requirements for man of all the essential L-aminoacids required by man; in that the amount of carbohydrate ingested daily is from 15 to 75 g; in that the total caloric value of the daily diet is in the range of from 180 to 600 Kcals; and in that the ratio of weight of the proteinaceous material to the digestible carbohydrate in the daily diet is in the range of from 1:1 to 1:5.

17. A method according to claim 16 in which said ratio is in the range of from 1:2 to 1:4.

18. A method according to claim 17 in which the total caloric value of the daily diet is not greater than 360 Kcals.

19. A method according to claim 17 wherein said minerals, said proteinaceous material and said cabohydrate are ingested in the form of a dietary formulation characterized in that the smallest amount of said dietary formulation which contains at least said minimum daily requirements of each of the minerals required by man, also contains 15 to 25 g of said proteinaceous material, 30 to 45 g of said carbohydrate, and has a total caloric value of not greater than 360 Kcals.

20. A method according to claim 16 wherein said minerals, said proteinaceous material and said carbohydrate are ingested in the form of a dietary formulation characterized in that the smallest amount of said dietary formulation which contains at least said minimum daily requirements of each of the minerals required by man, also contains at least 15 g of said proteinaceous material, 15 to 75 g of said carbohydrate, has a total caloric value of 180 to 600 Kcals and the amounts of proteinaceous material and carbohydrates in said formulation are such that the weight ratio of the proteinaceous material to the carbohydrate is in the range of 1:1 to 1:5.

* * * * *

UNITED STATES PATENT OFFICE
CERTIFICATE OF CORRECTION

PATENT NO. : 4,009,265
DATED : February 22, 1977
INVENTOR(S) : Alan Norman Howard It is certified that error appears in the above-identified patent and that said Letters Patent are hereby corrected as shown below:

On the cover sheet of the patent, left column, under the heading "UNITED STATES PATENTS", read under the line in which "3,849,554" appears the following:

--3,701,666  10/1972   Winitz ............... 99/1

3,698,912  10/1972   Winitz ............... 99/14

3,697,287  10/1972   Winitz ............... 99/1

FOREIGN PATENTS

French Patent No. 1,078,839

French Patent No. 1,162,773--.

On the cover sheet of the patent, left column, under the heading "OTHER PUBLICATIONS", read under the line in which "N.Y. pp 1-18" appears the following:

--One panel of a package of "Instant Breakfast" sold by Carnation Company under the name of "Special Morning"

"Food Technology", April 1966, pp 54-66, W.S. Ogilvy

"Modified Giovannetti Diet", Journal of the New Zealand Dietetic Association, December 1966

"True Food Medical Department" (Guildford Surrey, March 1969) Investigation "True Food Specialized Formula Food No. 14"

UNITED STATES PATENT OFFICE
CERTIFICATE OF CORRECTION

PATENT NO. : 4,009,265
DATED : February 22, 1977
INVENTOR(S) : Alan Norman Howard It is certified that error appears in the above-identified patent and that said Letters Patent are hereby corrected as shown below:

Evans, F.A. and Strang, J.M., "A departure from the usual methods of treating obesity", Am J Med Sci 177:339-348, 1929

Evans, F.A. and Strang, J.M., "The treatment of obesity with low calorie diets", J Am Med Assoc 97:1063-1068, 1931

Evans, F.A., "Treatment of obesity with low calorie diets: Report of 121 additional cases", International Clin 3:19-23, 1938

Strang, J.M., McClugage, H.B. and Evans, F.A., "The nitrogen balance during dietary correction of obesity", Am J Med Sci 181:336-349, 1931

Strang, J.M., McClugage, H.B. and Evans, F.A., "Further studies in the dietary correction of obesity", Am J Med Sci 179:687-694, 1930

Herman L. Johnson, et al, "The American Journal of Clinical Nutrition" 24, August 1971, pp. 913-923

John E. Jones, et al, "The American Journal of Clinical Nutrition" 19, November 1966, pp. 320-328--.

UNITED STATES PATENT OFFICE
CERTIFICATE OF CORRECTION

Patent No. 4,009,265   Dated February 22, 1977

Inventor(s) Alan Norman Howard

It is certified that error appears in the above-identified patent and that said Letters Patent are hereby corrected as shown below:

Column 5, line 34, "tO" should read --to--.

Column 5, line 49, "dietarY" should read --dietary--.

Column 5, line 51, "osomotic" should read --osmotic--.

Column 8, line 54, "lowe" should read --lower--.

Column 9, line 53, "intented" should read --intended--.

Column 10, Table 1, under the heading "Salts", last entry, "Calcium chloride , $\overline{2H_2O\ 31.57}$", should read --Calcium chloride.$2H_2O$--.

Column 10, Table 1, under the heading "Vitamins", third entry, "Pyridoxin $\overline{HCl\ 21.6}$", should read --Pyridoxin HCl--.

Column 12, line 32, "secure" should read --severe--.

Column 13, line 16, "amont" should read ---amount---.

Signed and Sealed this sixteenth Day of August 1977

[SEAL]

Attest:

RUTH C. MASON
*Attesting Officer*

C. MARSHALL DANN
*Commissioner of Patents and Trademarks*